UNITED STATES PATENT OFFICE.

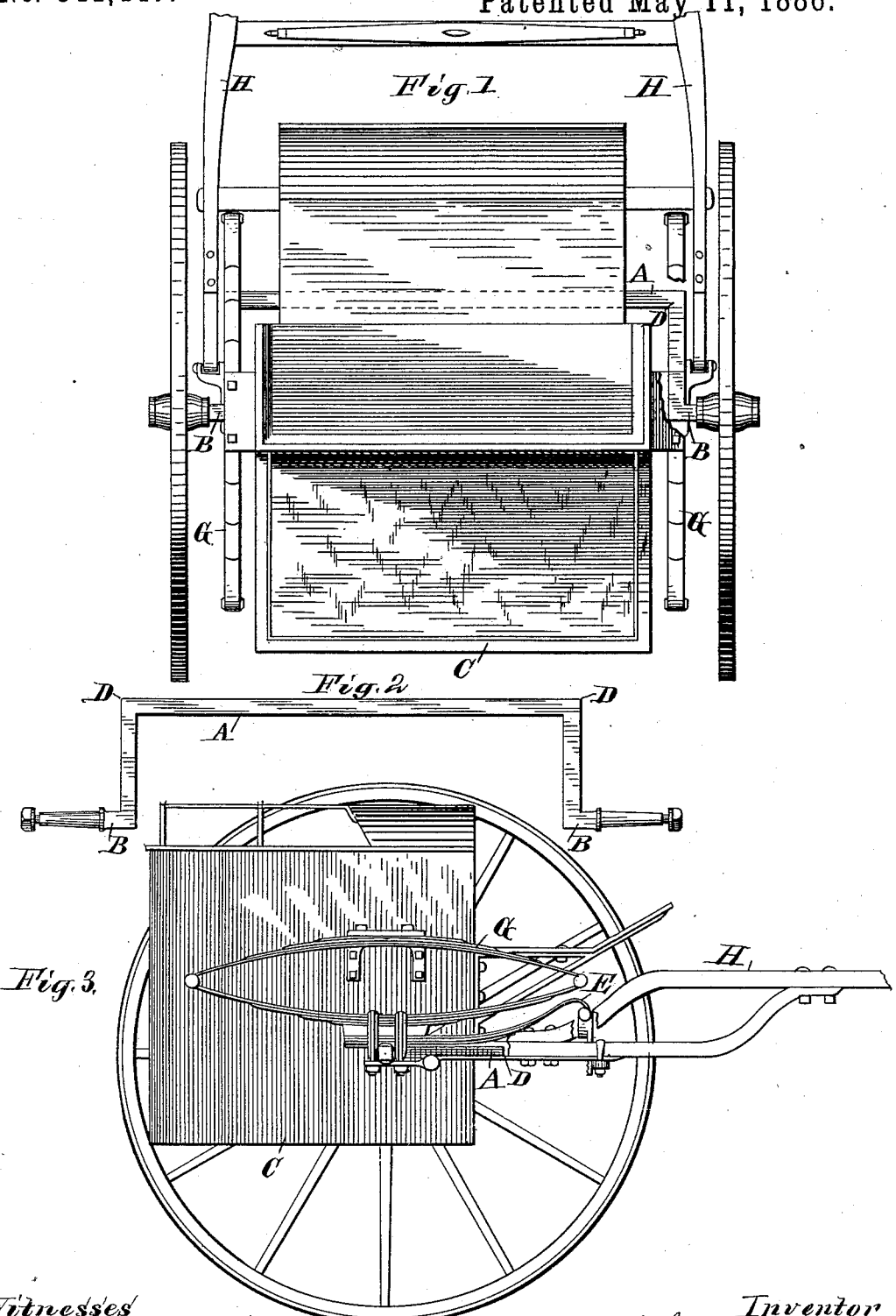

THOMAS H. BROWN, OF MILWAUKEE, WISCONSIN.

TWO-WHEELED VEHICLE.

SPECIFICATION forming part of Letters Patent No. 341,447, dated May 11, 1886.

Application filed May 12, 1885. Serial No. 165,180. (No model.)

*To all whom it may concern:*

Be it known that I, THOMAS H. BROWN, of Milwaukee, in the county of Milwaukee and State of Wisconsin, have invented new and useful Improvements in Two-Wheeled Vehicles; and I do hereby declare the following to be a full, clear, and exact description of said invention, reference being had to the accompanying drawings, and to the letters or figures of reference marked thereon, which form a part of this specification.

My invention relates to improvements in two-wheeled vehicles; and it pertains more especially to the peculiar construction of the axle, whereby the body of the vehicle may be suspended below the hubs of the wheels at any desired plane above the surface of the ground, and freely move upward and downward with the compression or expansion of the springs without liability of being brought into contact with the axle.

My improvement will be understood by reference to the accompanying drawings, to which reference is herein made.

Figure 1 represents a top view, and Fig. 3a side view, of one form of two-wheeled vehicle embodying my improvements. Fig. 2 represents a top view of the axle removed from the other parts of the vehicle.

Like parts are represented by the same reference-letters throughout the several views.

A represents the axle, which projects inward from its respective ends but a short distance only past the inner end of the hubs, leaving spaces at B B for the supporting-springs G G, whereby the weight of the body and load is brought as near as practicable to the wheels. From the points B the axle extends horizontally forward past the front end of the body C to D, and from thence horizontally inward, the center of the axle being brought in front of the body, whereby the body may be extended downward nearly to the ground, and may freely move upward and downward with the springs, as mentioned, without coming in contact with the axle. If desired, the axle may in like manner be extended horizontally rearward, passing behind instead of in front of the body, and for some form of body such form or arrangement of the axle, if not necessary, may be preferred.

The form of thills H H shown herein and the manner of connecting them by jointed couplings or shackles to the axle have been shown and claimed in a previous application for patent filed by me in the United States Patent Office March 13, 1883, and allowed December 11, 1884. The short springs E E, rigidly affixed at their rear ends to the axle, and connected at their front ends with the thills, and the device for adjusting the thills are also shown and claimed in an application made by me, bearing even date herewith. I therefore do not specifically claim such elements herein. The manner, however, of arranging the rear ends of the short springs E E above the forward bend of the axle, and directly beneath the elliptical side springs G G, whereby greater space than otherwise could be attained is provided for the body between the forward bends of the axle, and whereby the weight of the body and load is brought nearer to the wheels, as shown, I believe to be new.

Having thus described my invention, what I claim as new, and desire to secure by Letters Patent, is—

In a two-wheeled vehicle, the combination of the angular axle A, having forward-extending central portion located in front of the body of the vehicle, forward-extending short springs E E, affixed at their rear ends to said axle above its forward extension, and at their front ends to the thills by jointed couplings, thills H, attached at their rear ends to the axle by jointed couplings, side springs G G, attached to said axle above said short springs, and body C, suspended between said side springs, E E and G G, all substantially as and for the purpose specified.

In testimony whereof I affix my signature in presence of two witnesses.

THOMAS H. BROWN.

Witnesses:
JAS. B. ERWIN,
C. T. BENEDICT.